2,879,959

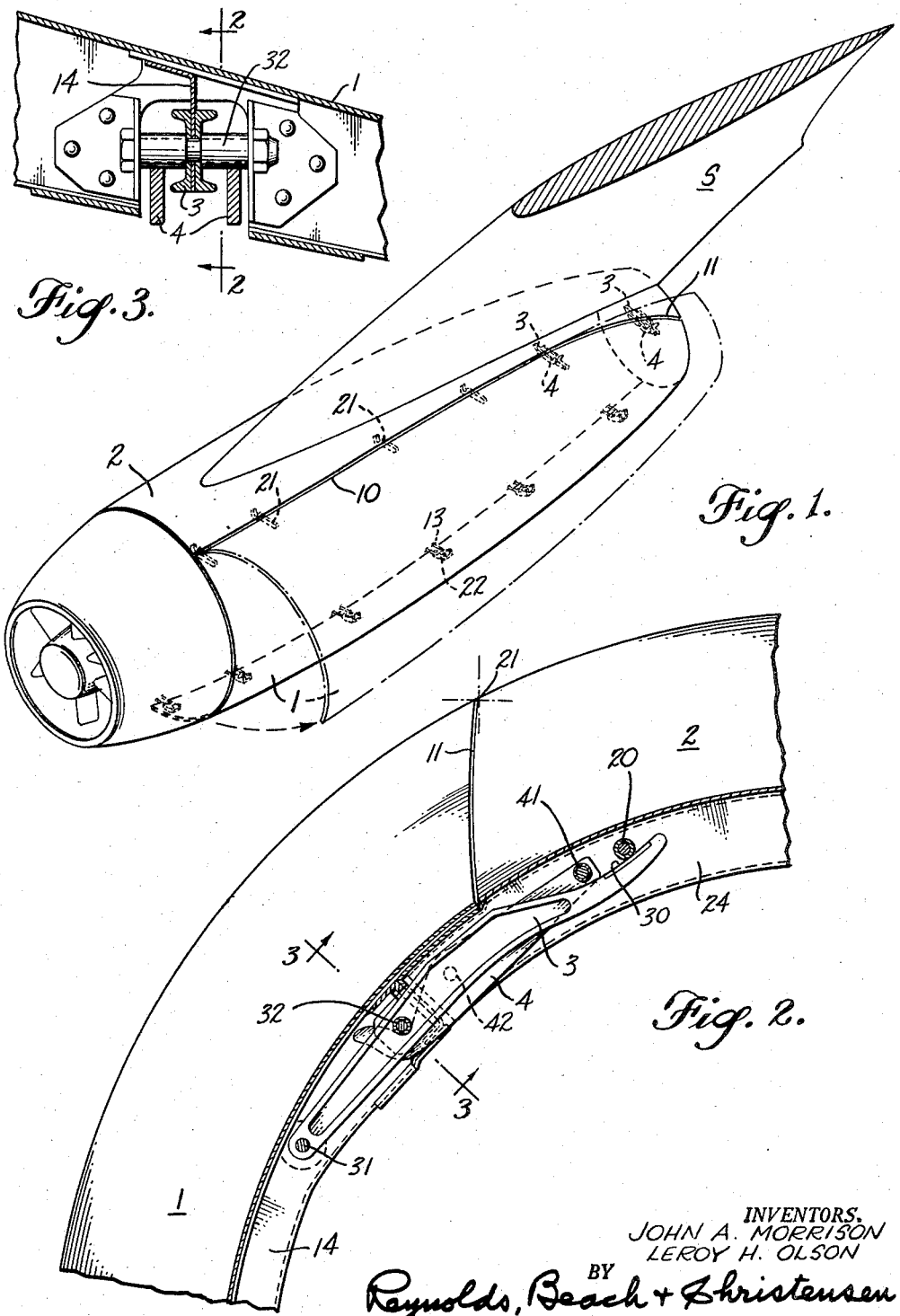

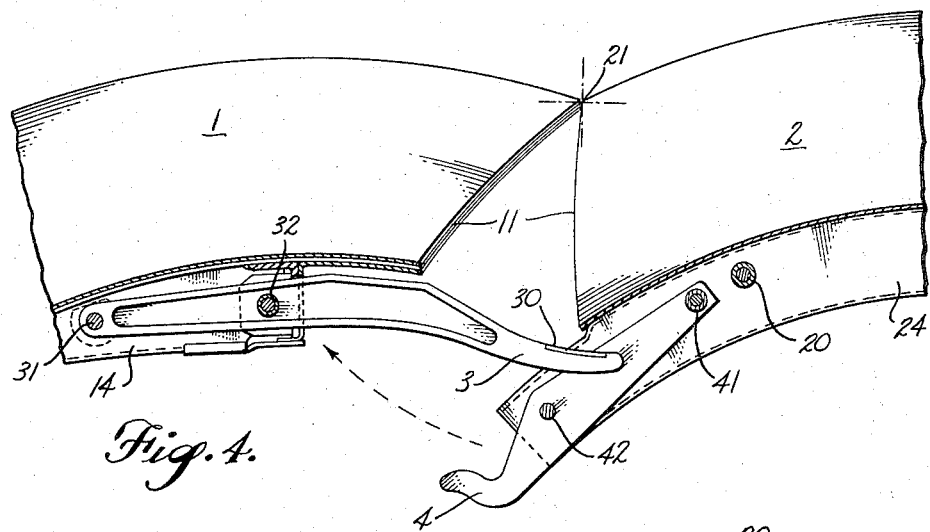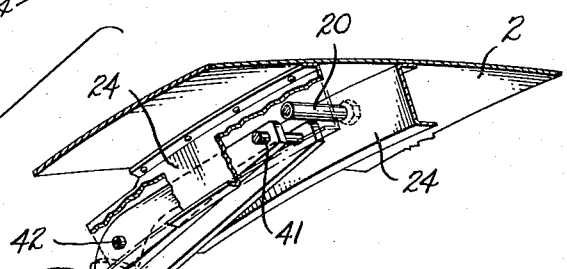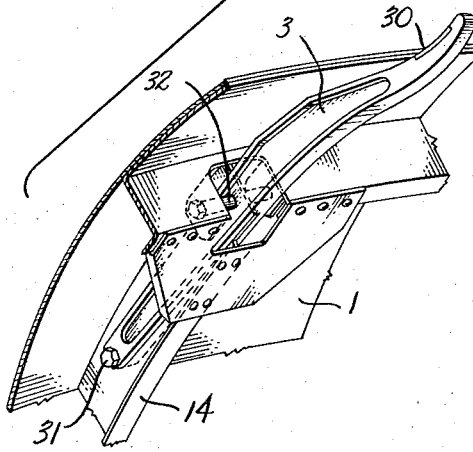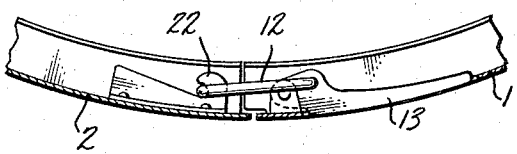
Fig. 4.  Fig. 5.  Fig. 6.
INVENTORS.
JOHN A. MORRISON
LEROY H. OLSON
BY
Reynolds, Beach & Christensen
ATTORNEYS

United States Patent Office 2,879,959
Patented Mar. 31, 1959

COWL SECURING MEANS

John A. Morrison, Seattle, and LeRoy H. Olson, Bellevue, Wash., assignors to Boeing Airplane Company, Seattle, Wash., a corporation of Delaware Application February 17, 1955, Serial No. 488,967

8 Claims. (Cl. 244—129)

Jet engines on aircraft are commonly mounted in pods supported at the lower end of a strut depending from a wing or other airframe element. The engine is housed within a streamlined housing or cowl structure, which must be removed or opened to permit servicing of the engine. The rear end of such cowl is formed on a long taper, although the portion intermediate the ends may be approximately cylindrical.

Preferably the cowl is not removed for servicing, but each side constitutes a panel which is hingedly mounted along an edge close to the top of the pod, to swing up and so to constitute a canopy to protect mechanics from the weather while they work on the engine. If it were not for the presence of the supporting strut the cowl side panels could be hinged along the uppermost generatrix of the streamlined pod. The presence of the strut at this location, the interference with the strut by the convexity of the cowl side panel if upswung materially, and other considerations, make it impractical to locate the hinge axis along a generatrix. Instead, the hinge line is offset laterally from the strut, and the upper meeting edges of the swingable panel and of the fixed cowl part are defined somewhat as though by the intersection of a chordal plane, parallel to the axis, with the cowl's streamlined surface. The portion of those meeting edges which lies in the approximately cylindrical portion of the cowl is approximately straight, but the part which lies in the tapered rear portion of the cowl trends angularly about the cowl's axis as it proceeds rearwardly, so that it is curved, from whatever direction it is viewed. When the panel swings upwardly, this long curved upper edge portion moves away from the complemental meeting edge of the fixed cowl part, on the hinge axis defined along the cylindrical portion of the cowl.

The hinges constitute securing means between the upper meeting edges of the swingable panel and the fixed cowl part, but hinges can not connect the separable curved portions of the meeting edges in the tapered rear end of the cowl. The length of these curved extensions of the hinged edges is too great to allow them to remain unconnected during flight, it is undesirable to have fasteners that must be individually connected manually, and so it becomes necessary, and is the aim of this invention, to devise automatically interengageable securing means for use in the curved meeting edge portions of such an assembly.

According to this invention pairs of complemental elements are secured at intervals along the curved meeting edges, one of each pair on the swingable panel, the other on the fixed cowl part, so designed and so related to the hinge axis that these paired elements approach engagement as the panel swings down to closed position, and come into full engagement as its downswinging is completed. In full engagement they provide hooklike and strongly braced fastening means, capable of resisting torsional, radial, and longitudinal forces, and of holding the curved meeting edge portions securely, so long as simple latches, along the lower meeting edges, remain engaged.

The problem of so interengaging complemental securing means is magnified by the irregular curve of the upper meeting edges, but would still exist if this meeting edge were along a generatrix. No hinge connection capable of resisting the several types of stress to which such securing means are subjected can be devised, and because the meeting edges are separable in the rear end tapered portion of the cowl, the securing means must be separable, and automatically interengageable by the act of closing the side panel.

More specifically, it is the object of the present invention to provide interengageable fastening means, one on one cowl part and one on the other, capable of interengaging notwithstanding the wide swinging apart of the curved meeting edges; a spear fitting, with a bearing surface formed on a radius about the hinge axis, on the swingable cowl panel engages a cooperating element on the fixed cowl part from within the cowl, at the time a hook on the fixed cowl part engages with its complemental element on the swingable panel, also from within the cowl. The effect of the interengagement of these several parts is to hold the meeting edge of the fixed cowl part outwardly, and by reaction, to hold the meeting edge of the swingable panel inwardly, thereby retaining the outwardly open hook and its complemental element in firm and secure engagement, which can be disengaged only by swinging the swingable cowl part outwardly about its hinge axis again. Additionally, relative torsional movement of the cowl parts is prevented by the hooked interengagement, and relative longitudinal movement is prevented by the side-by-side location of the two interengaged elements. Outward accidental swinging of the swingable cowl panel can be prevented by interengagement of simple latch means across the opposite, lower meeting edge between the swingable and the fixed cowl parts.

The principles of the invention will be better understood from the following detailed disclosure taken in conjunction with the accompanying drawings, and the novelty will be particularly pointed out in the claims.

Figure 1 is a general isometric view of such a cowl and its supporting strut, showing in dot-dash lines the manner of swinging open the swingable cowl part.

Figure 2 is a sectional view transversely of the axis of the cowl, illustrating the securing means; the view point in Figure 2 is illustrated by the line 2—2 in Figure 3.

Figure 3 is a transverse sectional view through the securing means, the line of section being indicated at 3—3 in Figure 2.

Figure 4 is a view similar to Figure 2, but whereas Figure 2 shows the parts in the closed or interengaged position, Figure 4 shows them in a position short of engagement.

Figure 5 is an isometric view with the two cooperating parts of the securing means separated and in a positional relationship to one another such as is not capable of accomplishment in actual operation, but chosen for illustration of the two individual parts.

Figure 6 is a sectional view transversely to the axis of the cowl, illustrating the simple latch means along the lower meeting edges of the cowl parts.

A jet engine is illustrated in Figure 1 as part of a pod supported at the lower end of a strut S. The cowl part 1 is the movable panel, and the cowl part 2 may be taken as the fixed part. These two parts meet along a line which is necessarily offset from the juncture of the strut and the cowl as a whole. In the median or approximately cylindrical portion of the cowl this line is approximately straight, as shown at 10, and so the two cowl parts can be joined by simple hinge means indicated at 21 along the upper meeting edge. Towards the rear in the tapering portion of the cowl, this upper meeting edge is directed angularly with respect to the axis of the cowl as it proceeds rearwardly, so that there is a curved rear meeting edge 11 as a rearward extension of the approximately straight meeting edge 10 ahead of it. The opposite swinging meeting edge, however, may be straight, or of any convenient conformation. Latches such as the hook 22 on the fixed cowl part (see Figure 6), or on the opposite swingable side panel, the link 12 on the swingable cowl part, and the overcenter lever 13 on the swingable cowl part, will serve to hold these lower meeting edges together. Such latching means will be distributed along the length of this lower edge.

It is with the curved portion of the upper meeting edge in the tapering rear part of the cowl that the present invention is particularly concerned. It is necessary that there be rigid securement of the two cowl parts at intervals along this rather lengthy curved meeting edge portion, and that their interengagement be accomplished automatically by the operation of swinging the swingable cowl panel into closed position, and correspondingly released upon swinging that cowl panel toward open position.

According to the present invention, there is provided a spear cowl fitting 3 on the under or inner side of the swingable cowl panel 1, projecting transversely to the curved meeting edge 11 to project beneath the underside and the edge of the fixed cowl part 2. This spear fitting 3 is fixedly and rigidly secured to the swingable cowl panel 1, as by the pins 31 and 32, by which the fitting 3 is secured to a rib member 14 or the like, forming part of the swingable cowl panel 1. The fitting is long enough to reach across the hinge axis, hence those fittings nearer the rear tip are longer than those nearer the approximately cylindrical median portion of the cowl. The projecting tip of the fitting 3 is curved at 30 on a radius about the hinge axis 21.

In the vicinity of the spear cowl fitting 3 the fixed cowl part 2 carries a rigidly mounted hook member 4, which is mounted by the pins 41 and 42 or like means to a rib or other structural element 24 of the fixed cowl part, in such manner that the hooked end of the hook 4 projects beyond the meeting edge 11 to a position beneath the corresponding edge of the swingable cowl panel 1.

The hook 4 is so positioned and so shaped that when parts are in the closed position shown in Figure 2, the outwardly open hook will engage, from within, the pin 32 or a similar pin carried by the swingable cowl part 1. At the same time, due to the arcuate curvature of the bearing surface 30, this surface will engage the pin 20 fixed to the fixed cowl part 2, from within, and will hold the latter outwardly. By reaction through the spear fitting 3, across the hinge line, the swingable cowl panel 1 will be held or urged inwardly, and consequently its pin 32 can not disengage the hook 4. When parts are held thus in the closed position by the latches such as those shown in Figure 6, or any equivalent latches, the interengagement between the surface 30 and the pin 20, and between the hook 4 and the pin 32, is such that no relative movement of the two cowl parts, radially of the cowl as a whole, nor angularly about the axis thereof, is possible. Moreover, by forming one at least of the two interengaging parts 3 and 4 double, and in this instance it is the hook 4 which is doubled (see Figure 3), the two parts when interengaged are interdigitated, and this adequately prevents any relative movement in the axial direction between the two cowl parts when all are in the closed position.

In order to engage the two elements 3 and 4, it is only necessary to swing the cowl part 1 about the hinges at 21. Notwithstanding the curving offset of the meeting edge 11, the point of the spear fitting 3 will pass beneath the meeting edge of the fixed cowl part 2 in the manner indicated in Figure 4, and will slide beneath the pin 20 as it moves inwardly, or in the direction of the spear's length. The bearing surface 30 may be slightly cammed, to tighten the interconnection between itself and the pin 20, and urges outwardly at 20 and inwardly at 32 in the manner already described, for by this time the pin 32 has entered the hook 4 and has slid in the direction of the length of the spear, and inwardly about the hinge axis at 21, until the pin 32 has bottomed within the outwardly opening hook 4. In order to swing open the cowl part after release of the latches at 13, it is only necessary to swing the swingable cowl part 1 about the hinges at 21, and this withdraws the spear 3 in the direction of its own length as it swings around the hinge axis at 21. The swinging of the spear fitting 3 accomplishes a reverse or outward swinging of the pin 32 because the two are at opposite sides of the hinge axis at 21 and so, as is seen in Figure 4, the two separate easily and without interference of parts.

In Figure 5 the parts are shown in their locking position, but drawn apart to separate them and to show more fully the details of each individual part.

We claim as our invention:

1. In combination with a two-part cowl defining a generally streamlined body tapering inwardly at its rear end, wherein the two parts meet along a mating line which, in the median portion of the body, is approximately straight but which departs angularly from such approximately straight line as it proceeds rearwardly into the tapered rear end, to define a laterally curved extension thereof, hinge means joining said two cowl parts along the straight portion of such line for outward swinging of one such part relative to the other, latch means on the respective parts along the swinging edge of the hinged part interengageable to secure such swinging edge of the one part to the mating edge of the other part, a fitting on and projecting past the hinged edge of the swinging part in the curved extension of the mating line, said fitting being formed with a bearing surface curved substantially on an arc struck from the hinge axis, a hook open towards the hinge axis, mounted on the other part and extending past the mating edge thereof, a pin on the swinging part positioned for engagement by said hook when the edges of the two parts meet, and an element on the part which carries the hook, positioned for engagement by the arcuate bearing surface of the fitting when the edges of the two parts meet, cooperating with the hook to maintain the edges of the two parts against relative separation radially or angularly with relation to the cowl itself when so engaged.

2. The combination of claim 1, wherein the fitting is pointed to enter, as the swinging cowl part swings towards closed position, beneath the meeting edge of the hook-mounting cowl part, and shaped to engage the cooperating cam-engaged element from within the cowl body and to urge it outwardly, and at the same time by reaction to urge the hook-engaged pin inwardly, as the parts reach their closed position, for securement in such position by interengagement of the latch means at the opposite edge.

3. In combination with an aircraft cowl formed of a fixed and a swingable part cooperating to define a generally streamlined body tapering inwardly at its rear end, the two parts being shaped to meet along a longitudinal line which, in the median portion of the body, is approximately straight, but which departs angularly from such approximately straight line as it proceeds rearwardly into the tapered rear end, to define a laterally curved extension of the meeting line, hinge means joining said two cowl parts along the straight portion of such line for outward swinging of the swingable part relative to the fixed part about the longitudinal hinge axis, latch means on the respective parts interengageable to secure the swinging edge of the swingable part to the matching edge of the fixed part, a spear fitting fixed to and projecting past the hinged edge of the swingable part in the curved portion of such edge and having a bearing surface formed upon an arc approximately centered at the hinge axis, a transverse pin on said fitting in the vicinity of the cowl part's curved edge, an outwardly open hook fixed to the fixed cowl part and projecting past the hinged edge of the swingable part in position for engagement with and outward urging of said pin from within the cowl, and a second transverse pin fixed within the fixed cowl part in position for engagement and outward urging by said arcuate bearing surface of the spear fitting from within the cowl simultaneously with interengagement of the hook and its pin as the swingable cowl part reaches its closed position.

4. The combination of claim 3, wherein at least one of the spear fitting and the hook is doubled and the two are positioned to interdigitate when the cowl parts are closed.

5. In combination with a depending strut, a cowl defining a generally streamlined body tapering inwardly at its rear end and supported along its upper surface from said strut, said cowl including a fixed part and a swingable side panel hingedly connected to the fixed part along a longitudinal upper meeting line offset from said strut and which is approximately straight in the median portion of the cowl but curved by the cowl's taper in its rear portion so that the meeting edges within the curved part separate widely during hinging open and meet only when the cowl parts are closed, a spear fitting disposed along the curved portion of the swingable cowl panel's meeting edge and secured thereto in position slightly beneath its outer surface and projecting transversely to the meeting edge, said spear fitting being of a length to extend beyond the hinge axis, an outwardly open hook disposed in a like position but oppositely directed upon the fixed cowl part, a hook-engaged element secured upon the swingable cowl panel in position to be engaged from within by the hook as that cowl panel swings closed, a spear-engaged element secured upon the fixed cowl part in position to be engaged from within by the spear fitting as the swingable cowl panel swings closed, thereby to urge the spear-engaged element outwardly, and by reaction across the hinge axis to hold the hook-engaged element inwardly in engagement with the hook, and latch means interengageable between the two cowl parts, adjacent their opposite meeting edges, to retain parts thus in closed position.

6. A lock for retaining the hinged edge of a hingedly mounted door closed against the mating edge of the fixed structure whereon the door is hinged, especially when the door's edge and the mating edge are offset with relation to the hinge axis, said lock comprising a fitting on and projecting past the hinged edge of the door and formed with a bearing surface curved substantially on an arc struck from the hinge axis, a hook open towards the hinge axis and fixedly supported on the fixed structure and extending past the structure's mating edge into the path of the door radially outwardly from its hinge axis, a pin on the door positioned for engagement by said hook when the respective mating edges meet, and an element on the fixed structure positioned for engagement by the arcuate bearing surface of the fitting when the mating edges approach the engaged pin and hook and the engaged element and fitting, cooperating to maintain the mating edges against relative separation radially or angularly.

7. A lock for retaining the hinged edge of a hingedly mounted door, in the part of such hinged edge that is radially spaced from the hinge axis, closed against the mating edge of the fixed structure whereon the door is hinged, said lock comprising a spear fitting mounted upon the door's hinged edge in a position slightly beneath the outer surface thereof and directed transversely to and past the door's hinged edge, an outwardly open hook disposed in like position but oppositely directed upon the fixed structure, a hook-engaged element secured upon the door in position to be engaged within the hook as the door swings closed, and a spear-engaged element secured upon the fixed structure in position to be engaged from within by the spear fitting as the door swings closed, thereby to urge the spear-engaged element outwardly, and by reaction across the hinge axis to hold the hook-engaged element inwardly within the hook.

8. A lock as in claim 7, wherein the spear fitting is formed, on the surface that engages its complemental element, along an arcuate curve struck from the hinge axis.

References Cited in the file of this patent

UNITED STATES PATENTS

| | | |
|---|---|---|
| 2,299,489 | Nundinger | Oct. 20, 1942 |
| 2,549,110 | Michael | Apr. 17, 1951 |
| 2,550,337 | Duffenbach et al. | Apr. 24, 1951 |
| 2,661,975 | Michael | Dec. 8, 1953 |